United States Patent [19]
Coburn, Jr.

[11] Patent Number: 4,491,389
[45] Date of Patent: Jan. 1, 1985

[54] CUSHION MIRROR

[76] Inventor: Joseph W. Coburn, Jr., 675 Ocean Ave., Long Branch, N.J. 07740

[21] Appl. No.: 395,637

[22] Filed: Jul. 6, 1982

[51] Int. Cl.³ .......................... G02B 5/08; G02B 5/12; A47F 7/14; A47G 1/16
[52] U.S. Cl. .................................. 350/609; 350/642; 248/466; 248/467
[58] Field of Search ............... 350/310, 295, 292, 288; 248/466, 467

[56] References Cited

U.S. PATENT DOCUMENTS

| | | | |
|---|---|---|---|
| 2,294,940 | 9/1942 | Skolnick | 350/310 |
| 3,608,179 | 9/1971 | Jeffree et al. | 350/310 X |
| 3,733,116 | 5/1973 | Hutchinson | 350/310 X |
| 3,810,691 | 5/1974 | Seiden | 350/310 X |
| 3,912,380 | 10/1975 | Klein | 350/310 |
| 3,936,159 | 2/1976 | Pavenick | 350/295 X |
| 4,218,114 | 8/1980 | Bunch | 350/292 |

Primary Examiner—John K. Corbin
Assistant Examiner—Richard F. Gallivan
Attorney, Agent, or Firm—R. Gale Rhodes, Jr.

[57] ABSTRACT

An improved mirror including a cushion intermediate the mirror's reflecting surface and the mirror's support surface which cushion absorbs any surface irregularity in the support surface and causes the support surface to present a substantially flat support surface to the reflecting surface whereby any distorting effect of the surface irregularity on images produced by the mirror's reflecting surface is substantially eliminated.

7 Claims, 2 Drawing Figures

U.S. Patent    Jan. 1, 1985    4,491,389
FIG. 1
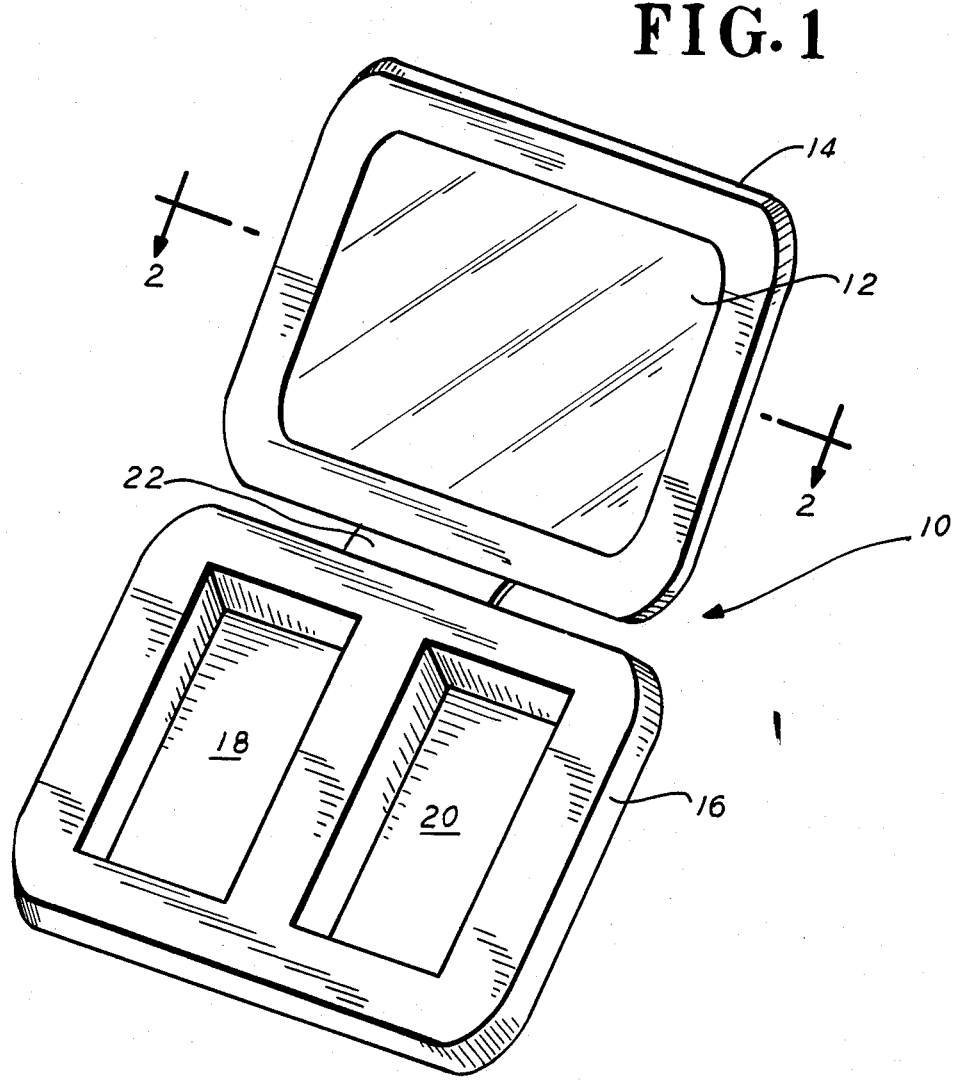
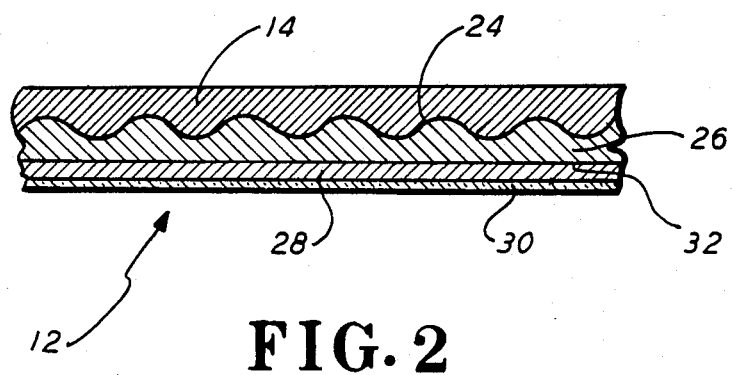
FIG. 2

CUSHION MIRROR

BACKGROUND OF THE INVENTION

This invention relates generally to a new and improved mirror, and in particular it relates to a new and improved low-cost mirror substantially free of mirror distortion and particularly suitable for being embodied to a toy such as a toy compact.

As known to those skilled in the mirror art, the primary requirement for any mirror is that it produce reflected images free of distortion. This requirement is inviolate for very expensive beauty and decorative mirrors but is subject to some compromise in mirrors of relative low-cost application, such as mirrors for toys, where there can be an economically acceptable compromise between the cost of the mirror and the amount of distortion present. However, as is also known to those skilled in the art, the greater the amount of distortion present the less attractive the mirror and the less attractive the mirror the less the saleability of the mirror and the item, such as a toy, including the mirror.

As still further known to those skilled in the art, the amount of distortion present in a reflected image produced by a mirror is a direct function of the smoothness or flatness of the mirror's reflecting surface; the smoother and flatter the reflecting surface, the more distortion-free are the reflected images. Typical of a low-cost mirror, particularly one that may be found in a toy application, is a layer of molded plastic providing a support surface for the low-cost mirror and a layer of metallized plastic film or even a layer of metal foil, supported by the support surface and providing the reflecting surface. Due to the plastic being molded, such as being produced by injection molding, the support surface of the plastic layer is non-uniform or has what is referred to as surface irregularity. Upon the metallized plastic film or particularly the metal foil being placed on the supporting surface, the surface irregularity is transferred to the metallized plastic film or metal foil causing the reflecting surface to be non-uniform or irregular whereby the reflected images produced by the mirror's reflecting surface are distorted. It is, of course, technically possible to form a layer of plastic providing a mirror support surface virtually free of surface irregularities but the cost of such manufacture generally tends to make the mirror too expensive for typical low-cost applications.

Efforts have been made in the past to overcome this image distortion problem by forming the mirror's reflecting surface on a relatively rigid and thereby relatively flat material such as a relatively thick layer of plexiglass or acrylic, such plexiglass or acrylic typically being in the order of 0.125 inch thick. This structure has been found to be undesirably expensive and, due to its thickness, especially when supported by a substrate such as a supporting surface provided by a layer of plastic, to be so thick as not to be aesthetically pleasing to the intended customer.

Hence, there exists a need in the art for a low-cost mirror substantially free of image distortion which can be manufactured for an economically acceptable cost and which will be sufficiently free of image distortion as to be aesthetically attractive to the intended purchaser and therefore highly saleable.

SUMMARY OF THE INVENTION

The primary object of the present invention is to provide a new and improved mirror substantially free of image distortion which can be manufactured inexpensively with desired aesthetic appeal particularly for low-cost applications, and the secondary object of the present invention is to provide a new and improved low-cost mirror substantially free of image distortion particularly useful for embodiment in a toy such as, for example, a toy compact.

The above-noted image distortion problems are overcome by the improved mirror of the present invention which includes a cushion intermediate the mirror's reflecting surface and the mirror's support surface which cushion absorbs any surface irregularity in the support surface and causes the support surface to present a substantially flat support surface to the reflecting surface whereby any distorting effect of the surface irregularity on images produced by the reflecting surface is substantially eliminated.

DESCRIPTION OF THE DRAWINGS

FIG. 1 is an illustration in perspective of a toy compact embodying the present invention; and FIG. 2 is an enlarged cross-sectional, diagrammatic illustration taken substantially along the line 2—2 in FIG. 1 in the direction of the arrows.

DESCRIPTION OF THE PREFERRED EMBODIMENT

Referring now to FIG. 1, there is shown a toy compact identified generally by numerical designation 10 which embodies the new and improved mirror of the present invention which is indicated by general numerical designation 12. The compact 10 includes a top 14 provided with a support surface 15 for supporting the mirror 12, a bottom 16 which may be provided with compartments 18 and 20 for receiving powder and rouge, or the like, and a hinge 22 which may be formed integrally with the top 14 and bottom 16 or suitably secured thereto by a suitable adhesive. The toy compact 10 may be made of various commerically available plastics known to those skilled in the art and may be manufactured, for example, by injection molding. As noted above, and as illustrated in FIG. 2, the process of forming the plastic top 14, such as by the noted injection molding process typically causes the support surface 15 of the plastic layer 14 underlying the mirror 12 to have surface irregularity as indicated by the irregular line 24 in FIG. 2. In accordance with the teaching of the present invention, the distorting effect of such support surface irregularity may be substantially eliminated by a cushion such as provided by a layer of closed cell polyether foam 26 also shown in FIG. 2; the polyether foam 26 may be any one of several commercially available polyether foams known to those skilled in the art. As further illustrated diagrammatically in FIG. 2, the cushion provided by the layer of polyether foam 26 substantially absorbs the surface irregularity of the plastic layer 14 and causes the plastic layer 14 to present a substantially flat support surface for supporting a layer of polyester 28 provided with a metallized surface 30 which provides the reflecting surface of the mirror 12; the substantially flat support surface provided by the cushion or polyether foam 26 is indicated by the straight line 32 in FIG. 2. The layer of polyester 28 may be one of several commercially available polyester films known to those skilled in the art and the metallized surface 30 may be suitably formed from aluminum by various well-known vacuum deposition techniques also known to those skilled in the art. The cushion or layer of polyether foam 26 may be suitably secured to the support surface of the plastic layer 14 having the surface irregularity indicated by irregular line 24 in FIG. 2 by any one of several commercially available adhesives known to those skilled in the art, such as for example Rohm & Haas QR667 adhesive and such adhesive, or other suitable commerically available adhesives, may also be used to secure the layer of polyester film 28 to the cushion or layer of polyether foam 26.

In one embodiment of the present invention, the layer of polyester film 28 had a thickness of from substantially 0.003–0.007 inch and the metallized surface 30, providing the mirror's reflecting surface, had a thickness of substantially 3 ohms per square area, and the layer of polyether foam 26 had a thickness of substantially 0.025 inch.

While the preferred embodiment of the present invention has been taught in the context of a toy compact, it will be understood by those skilled in the art that the present invention is not so limited but rather has general application wherever a relatively low-cost mirror substantially free of image distortion is desired. Still further, it will be understood by those skilled in the art that various modifications and variations may be made in the present invention without departing from the spirit and scope thereof.

What is claimed is:

1. Apparatus providing a mirror, comprising:
   support means having a support surface for supporting mirror means, said support surface having surface irregularity;
   mirror means including a layer of predetermined plastic film having a metallized surface on one side providing a reflecting surface that produces images by reflection and having a backing surface on the opposite side opposed to said support surface; and
   cushion means intermediate said support surface and said mirror means, said cushion means for substantially absorbing said surface irregularity thereby causing said support surface to present a substantially flat support surface to said mirror means whereby the distorting effect of said surface irregularity on the images produced by said reflecting surface is substantially eliminated.

2. Apparatus according to claim 1 wherein said predetermined plastic film comprises polyester film substantially 0.003–0.007 inch thick and wherein said metallized surface is a layer of metallized aluminum substantially 3 ohms per square area thick.

3. Apparatus according to claims 1 or 2 wherein said cushioning means is a layer of polyether foam substantially 0.025 inch thick.

4. Apparatus according to claim 3 further including adhesive means for securing said cushion means to said supporting surface and to said mirror means.

5. Apparatus for providing a mirror, comprising:
   a rigid mirror support surface having surface irregularity;
   a non-rigid mirror having a reflecting surface that produces images by reflection; and
   a layer of conformable material conforming to said surface irregularity and for causing said support surface to present a flat support surface to said non-rigid mirror whereby the distorting effect of said surface irregularity on images produced by said mirror is substantially eliminated, said conformable material secured to said support surface and to said mirror.

6. Apparatus according to claim 5 wherein said layer of conformable matter is a layer of closed cell polyether foam.

7. Apparatus for providing a mirror, providing:
   a rigid mirror support surface having surface irregularity;
   a flexible mirror having a backing surface and a reflecting surface that produces images by reflection; and
   a layer of closed cell polyether foam intermediate said support surface and said flexible mirror, said foam conforming to said surface irregularity of said mirror of said rigid mirror support surface and providing a flat surface for engaging and supporting said flexible mirror whereby the distorting effect of said surface irregularity on the images produced by said reflecting surface is substantially eliminated, said layer of foam secured to said support surface and to said flexible mirror.

* * * * *